(12) United States Patent
Moon

(10) Patent No.: US 6,293,888 B1
(45) Date of Patent: Sep. 25, 2001

(54) WIDE RATIO COVERAGE CONTINUOUSLY VARIABLE TRANSMISSION

(76) Inventor: Byung Il Moon, Jeongnung-dong 140-2, Sungbuk-ku, Seoul 136-100 (KR)

( * ) Notice: Subject to any disclaimer, the term of this patent is extended or adjusted under 35 U.S.C. 154(b) by 0 days.

(21) Appl. No.: 09/486,597

(22) PCT Filed: Sep. 2, 1998

(86) PCT No.: PCT/KR98/00271

§ 371 Date: Apr. 13, 2000

§ 102(e) Date: Apr. 13, 2000

(87) PCT Pub. No.: WO99/11950

PCT Pub. Date: Mar. 11, 1999

(30) Foreign Application Priority Data

Sep. 3, 1997 (KR) .................................................. 97-45633

(51) Int. Cl.[7] .............................................. F16H 37/08
(52) U.S. Cl. ........................................................ 475/210
(58) Field of Search .............................................. 475/210

(56) References Cited

U.S. PATENT DOCUMENTS

| | | | |
|---|---|---|---|
| 5,470,285 | * 11/1995 | Schneider et al. | 475/210 |
| 5,803,858 | * 9/1998 | Haka | 475/210 |
| 5,803,859 | * 9/1998 | Haka | 475/210 |
| 5,827,146 | * 10/1998 | Yan et al. | 475/210 |

* cited by examiner

*Primary Examiner*—Dirk Wright
(74) *Attorney, Agent, or Firm*—Ladas & Parry

(57) ABSTRACT

Provided with a wide ratio coverage CVT which has a driving power source, a first coupling axis, a clutch section, a second coupling axis, and a forward and rearward driving section, the CVT comprising: an input axis; an output axis located on the same axis with the input axis; a continuously variable unit section having a first continuously variable axis rotatably mounted on the output axis, a continuously variable driving part mounted on the first continuously variable axis, a continuously variable driven part mounted on a second continuously variable axis, and a continuously variable coupler for transmitting rotational power from the continuously variable driving part to the driven part; a coupling section having a first coupler integrally formed with the second continuously variable axis, a second coupler integrally formed with the output axis, and a third coupler for transmitting rotational power from the first coupler to the second coupler; and a gear section provided in the form of a gear set located between the input axis and the continuously variable unit section, the respective components of the gear section being operatively coupled to the input axis, the output axis, and the first continuously variable axis.

It is possible to prevent a rapid decrease in the transmission efficiency at high and low speeds, reducing fuel consumption and exhaust gas and enhancing acceleration performance with a wider ratio coverage.

9 Claims, 5 Drawing Sheets

WIDE RATIO COVERAGE CONTINUOUSLY VARIABLE TRANSMISSION

BACKGROUND OF THE INVENTION

1. Field of the Invention

The present invention relates to a continuously variable transmission (CVT) and, more particularly, to a wide ratio coverage CVT which is adapted to enhance the transmission efficiency over the conventional CVT at low and high speeds and improve its application by providing a high torque driving force.

2. Description of the Related Art

In the prior art, a CVT uses a continuously variable unit section only resulting in the disadvantage of a rapid reduction in transmission efficiency at high and low speeds due to the characteristics of the continuously variable unit section.

Therefore, some problems arise in that the fuel efficiency is not good at high and low speeds, which adversely effects the exhaust emissions, and the transmission efficiency is decreased more at high and low speeds when used in large-sized vehicles (large automobile, truck, etc.), and as a result, the application of the CVT is limited.

SUMMARY OF THE INVENTION

Accordingly, an object of the present invention is to provide a wide ratio coverage CVT to prevent rapid transmission efficiency deterioration at high and low speeds where only a continuously variable unit section is used.

Another object of the present invention is to provide a wide ratio coverage CVT with a fuel efficiency mode for providing optimized fuel efficiency, a power mode for dynamic driving, and a low speed mode for attaining an engine breaking effect.

Still another object of the present invention is to provide a wide ratio coverage CVT which has a wide ratio coverage and high efficiency at high and low speeds to prevent the deterioration of transmission efficiency at a high torque, thereby being applicable to large-sized automobiles and other devices requiring high torque, and which can be readily installed in any a front wheel, rear wheel or multi-wheel drive cars since it has input and output axes which are coaxially located.

To attain the objects of the present invention, there is provided a wide ratio coverage CVT which includes a driving power source, a first coupling axis, a clutch section, a second coupling axis, and a forward and rearward driving section, the CVT comprising: an input axis; an output axis located on the same axis with the input axis; a continuously variable unit section having a first continuously variable axis rotatably mounted on the output axis, a continuously variable driving part mounted on the first continuously variable axis, a continuously variable driven part mounted on a second continuously variable axis, and a continuously variable coupler for conveying the power from the continuously variable driving part to the continuously variable driven part; a coupling section having a first coupler integrally formed with the second continuously variable axis, a second coupler integrally formed with the output axis, and a third coupler for transmitting rotational power from the first coupler to the second coupler; and a gear section provided in the form of a gear set located between the input axis and the continuously variable unit section, the respective components of the gear section being operatively coupled to the input axis, the output axis, and the first continuously variable axis.

BRIEF DESCRIPTION OF THE INVENTION

DETAILED DESCRIPTION OF THE INVENTION

The present invention can be arranged in various configurations including the gear section, the continuously variable unit section and the coupling section. The first preferred embodiment of the present invention will be described with reference to FIG. 1.

Figure 1:
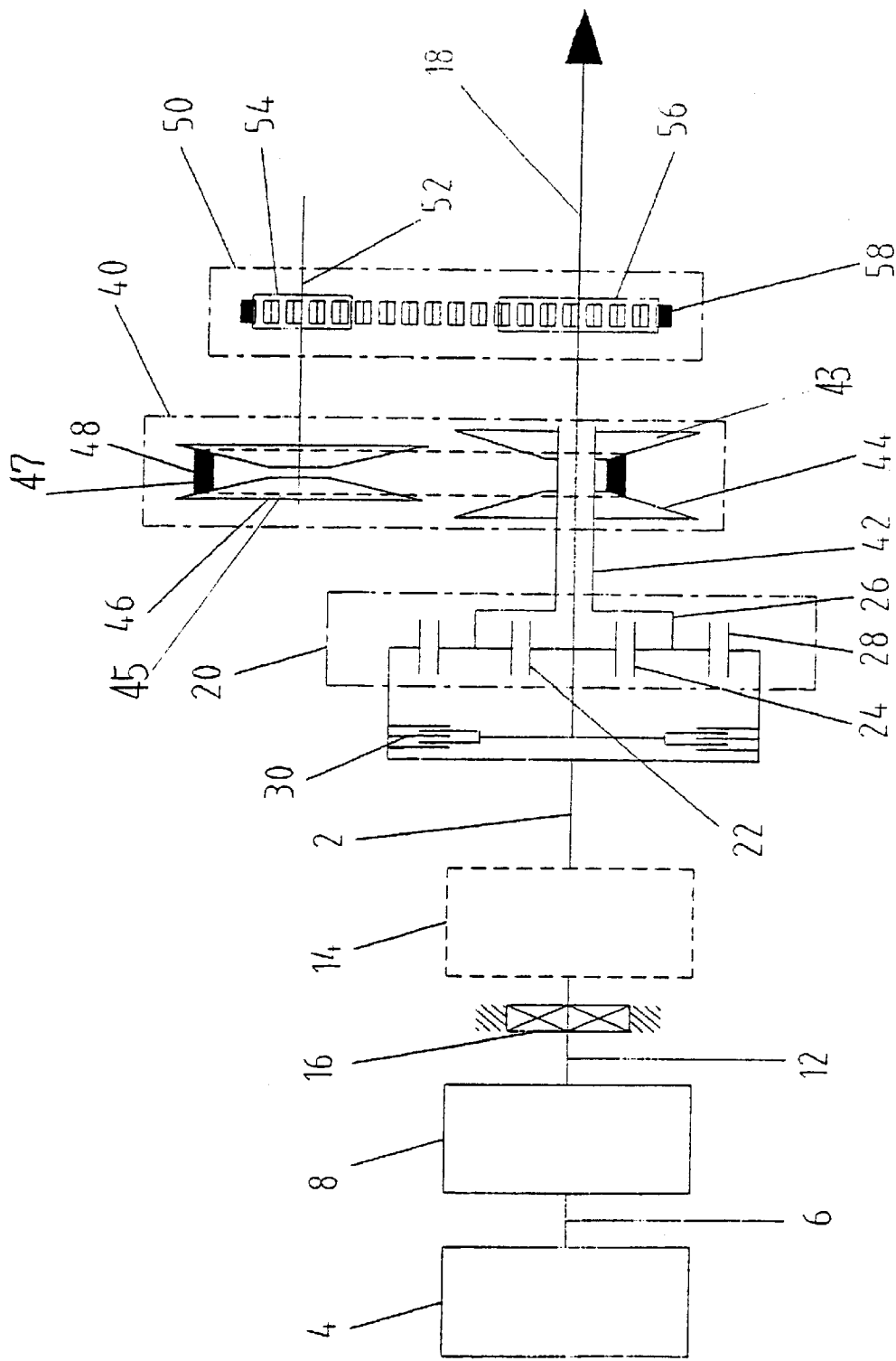
FIG. 1 is a schematic elevation illustrating a first preferred embodiment of the CVT of the present invention.

As illustrated in FIG. 1, there is provided a general driving system in front of an input axis 2 in terms of the power transmission path. A driving power source 4 is an engine or motor which generates torque. This driving power source 4 transmits the torque to a clutch section 8 through a first coupling axis 6 such as crank shaft. The clutch section 8, comprising a torque converter or a magnetic clutch, transmits the torque to a forward and rearward driving section 14 through a second coupling axis 12. A one-way clutch 16 is provided on the second coupling axis 12 to prevent the second coupling axis 12 from rotating in a reverse rotational direction to that of the driving power source 4. This prevents a vehicle from spontaneously being powered backward as, for example, when the vehicle goes up a hill, stops and rolls backward. The forward and rearward driving section 14 may be installed at the back of an output axis 18 but is preferably located as illustrated in FIG. 1 where the variation of the torque is constant and the torque is low. However, it can be disposed at other operable positions due to space limitations. If the forward and rearward driving section 14 is installed at the back of the output axis 18, the second coupling axis 12 and the input axis 2 are same axies.

Referring to FIG. 1, the forward and rearward driving section 14 transmits the torque to the input axis 2.

The input axis 2 is directly connected to a ring gear 28 of a gear section 20 and transmits the torque to the ring gear 28. Further, a clutch 30 is positioned between the input and output axes 2 and 18 so that it is operatively coupled to each when the input and output axes are rotating at the same rotational speed in order to enhance efficiency of the transmission. Clutch 30 can be attached at an appropriate position in order to realize a simultaneous rotation of the input and output axes 2 and 18.

Figure 5:
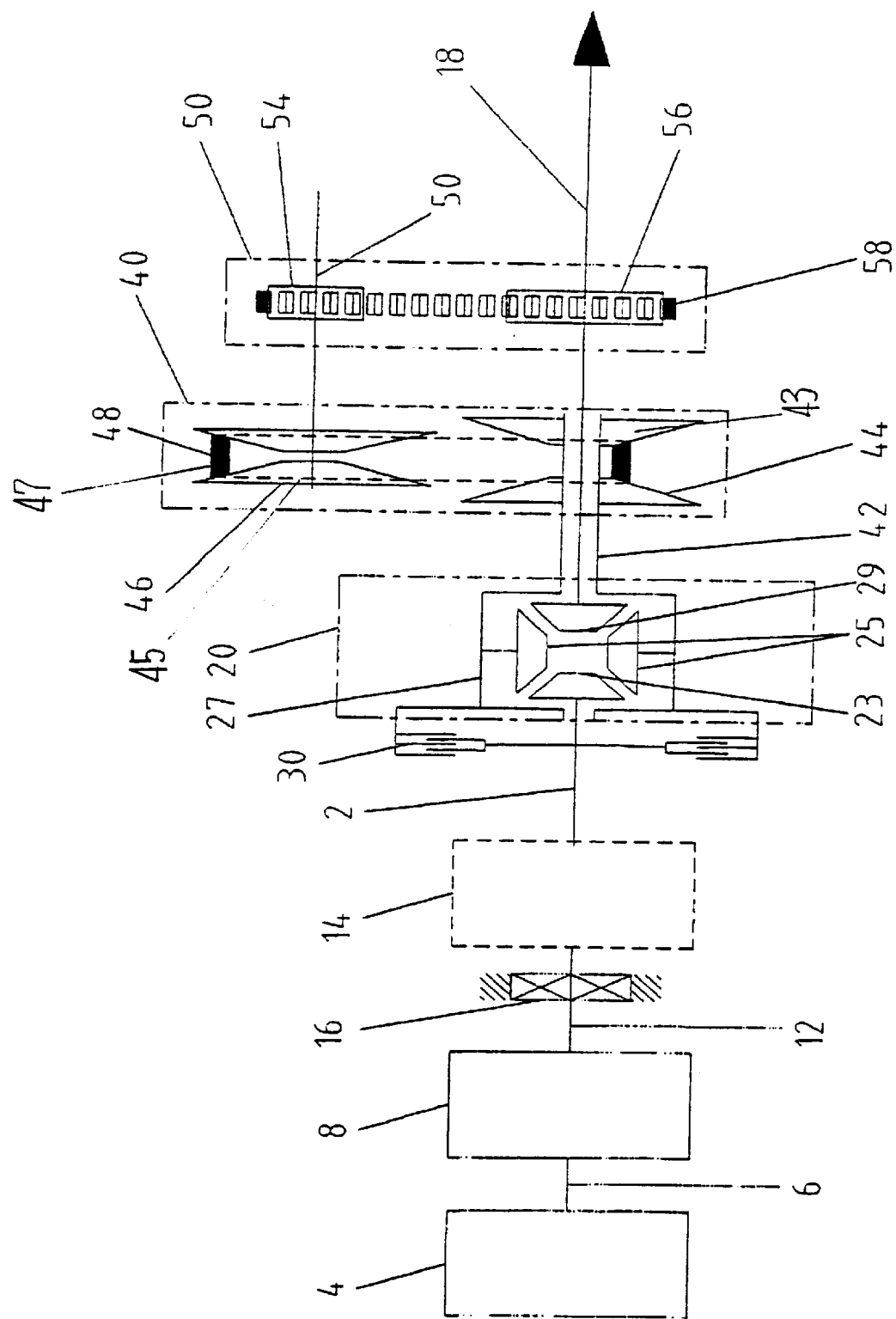
FIG. 5 is a schematic elevation illustrating a fifth preferred embodiment of the CVT of the present invention.

The gear section 20 is in the form of a planetary gear set, comprising a sun gear 22, a planet gear 24, a carrier 26 for supporting the planet gear 24, and the ring gear 28. The gear section 20 may be provided as a differential gear set, as illustrated in FIG. 5, comprising a first gear 23, an idle gear 25, a housing 27 for supporting the idle gear 25, and a second gear 29.

When a vehicle or an object stops and thus the sun gear 22 coupled to the output axis 18 is stopped, the carrier 26 coupled to a first continuously variable axis 42 of a continuously variable unit section 40 (hereinafter described) is subjected to decreased rotation with respect to the ring gear 28, transmitting an increased torque relative to that of the ring gear 28 to the carrier 26. This torque is then transmitted from the carrier 26 to a continuously variable driving part 43 (hereinafter described) installed on the first continuously variable axis 42 of the continuously variable unit section 40.

The continuously variable unit section 40 is well known in the related art examples of which are a pulley type, a traction type, etc. This continuously variable unit section 40 comprises the first continuously variable axis 42 rotatably mounted on the output shaft 18, a continuously variable driving part 43 mounted on the first continuously variable axis 42, a continuously variable driven part 45 mounted on a second continuously variable axis 52 parallel to the input and the output axis, and a continuously variable coupler 47 for conveying power from the continuously variable driving part 43 to the driven part 45.

The pulley type is described. That is, the driving pulley 44 corresponds to the continuously variable driving part 43, the driven pulley 46 corresponds to the continuously variable driven part 45, and the belt (or chain) 48 corresponds to the continuously variable coupler 47. The driving pulley 44 transmits the torque to the driven pulley 46 via the belt 48. The mutual separation adjustment between the driving and driven pulleys 44 and 46 enables a stepless speed change. The torque is transmitted from the driven pulley 46 to a first coupler 54 of a coupling section 50 (hereafter described) through the second continuously variable axis 52. The driven pulley 46 and the first coupler 54 are integrally installed on the second continuously variable axis 52, so that the second continuously variable axis 52, the driven pulley 46 and the first coupler 54 are integrally rotated always at the same rotational speed and in the same rotational direction.

The coupling section 50 comprises the first coupler 54, a second coupler 56 and a third coupler 58 and causes an increase or decrease in the fixed ratio to facilitate a control of speed change. In the aspect of power transmission, the first, second and third couplers 54, 56 and 58, respectively, are constructed with components that correspond or cooperate with one another, for example, when the first and second couplers 54 and 56 are pulleys, the third coupler 58 is a belt, or when the first and second couplers 54 and 56 are sprockets, the third coupler 58 is a chain, or when the first and second couplers 54 and 56 are gears, the third coupler 58 is also a gear. The torque is transmitted from the first coupler 54 to the second coupler 56 via the third coupler 58, then the rotational speed is decreased or increased. This rotational speed is determined by the transmission characteristic of the system. Mostly, the type in which the rotational speed of the second coupler 56 is decreased relative to that of the first coupler 54 is used. The torque from the second coupler 56 is transmitted to the output axis 18.

On the output axis 18, the sun gear 22, the second coupler 56, and the clutch 30 are installed. The clutch 30 is to provide simultaneous rotation of the input and output axes 2 and 18, maximizing the transmission efficiency operatively in when the input and output axes 2 and 18 have the same rotational speed.

Hereinafter, the operation of the present invention will be described with reference to FIG. 1.

When torque is generated by the driving power source 4, it is transmitted to the clutch section 8 through the first coupling axis 6 and then transferred to the forward and rearward driving section 14 via the second coupling axis 12. The torque at the forward and rearward driving section 14 is transmitted to the input axis 2.

The torque is transmitted to the ring gear 28 from the input axis 2. As the vehicle or driving body is stopped at the initial stage, the output axis 18 and the sun gear 22 installed on the output axis 18 are stopped. Therefore, the carrier 26 coupled to the first pulley axis 42 is subjected to a decreased rotation with respected to the ring gear 28, and the torque increased relative to the ring gear 28 is transmitted to the carrier 26. This increased torque is transmitted to the first continuously variable axis 42.

The torque is transmitted from the first continuously variable axis 42 to the driving pulley 44 installed on the first continuously variable axis 42, and then to the driven pulley 46 through the belt 48. The process for transmitting the torque of the driving pulley 44 to the driven pulley 46 via the belt 48 is known in the art. Here, a stepless speed change is achieved through a mutual adjustment of the separation between the driving and driven pulleys 44 and 46. The torque is transmitted from the driven pulley 46 to the first coupler 54 through the second continuously variable axis 52.

The torque of the first coupler 54 is transmitted to the second coupler 56 through the third coupler 58, then the rotational speed is decreased or increased (generally in the decreased form). The torque is then transmitted to the output axis 18 from the second coupler 56.

The torque at the output axis 18 is used to balance the torque of the gear section 20 including the sun gear 22 coupled to the output axis 18, and the rest of the torque is used to accelerate the vehicle or driving body, thereby rotating the output axis 18.

When the rotational speed of the output axis 18 is gradually raised and reaches the rotational speed of the input axis 2, the clutch 30, installed for a simultaneous rotation of the input and output axes 2 and 18, is operated to achieve the same rotational speed of the input and output axis 2 and 18. In this aspect, there is no need to adjust the speed change by the continuously variable unit section 40 and no deterioration of the speed change efficiency in the continuously variable unit section 40. Consequently, the entire transmission efficiency can be enhanced.

If the output axis 18 is needed to rotate at higher speed than the input axis 2, clutch 30, installed on the input and output axes 2 and 18, does not operate and the output axis 18 is rotated at a higher rotational speed than the input axis 2 according to the speed change by the continuously variable unit section 40.

Next, second to fifth preferred embodiments of the present invention will be described. The present invention may be constructed to various embodiments according to the type of the gear section 20 and coupling of the respective components of the gear section 20. Here, the operational procedures of driving power source 4, first coupling axis 6, clutch section 8, second coupling axis 12, one-way clutch 16 and forward and rearward driving section 14, continuously variable unit section 40 and coupling section 50 are analogously given to the above description and will not be described here. The clutch 30 is provided to achieve a simultaneous rotation of the input and output axes 2 and 18. For example, the clutch 30 is installed between the input and output axes 2 and 18 in the first to third embodiments, while it is installed between the input axis 2 and the carrier 26 in the fourth embodiment (see FIG. 4), or between the input axis 2 and the housing 27 in the fifth embodiment (see FIG. 5). However, the operational procedures are the same as previously described.

Basically, the gear section 20 uses a planet gear set or a differential gear set. The planet gear set and the differential gear set are different from each other in the coupling to the input axis 2, the output axis 18 and the first continuously variable axis 42. However, both the planet gear set and the differential gear set are similar in the operational procedure using the coupling section 50 and the speed change procedure, which is set forth in the following table.

TABLE 1

Figure 2:
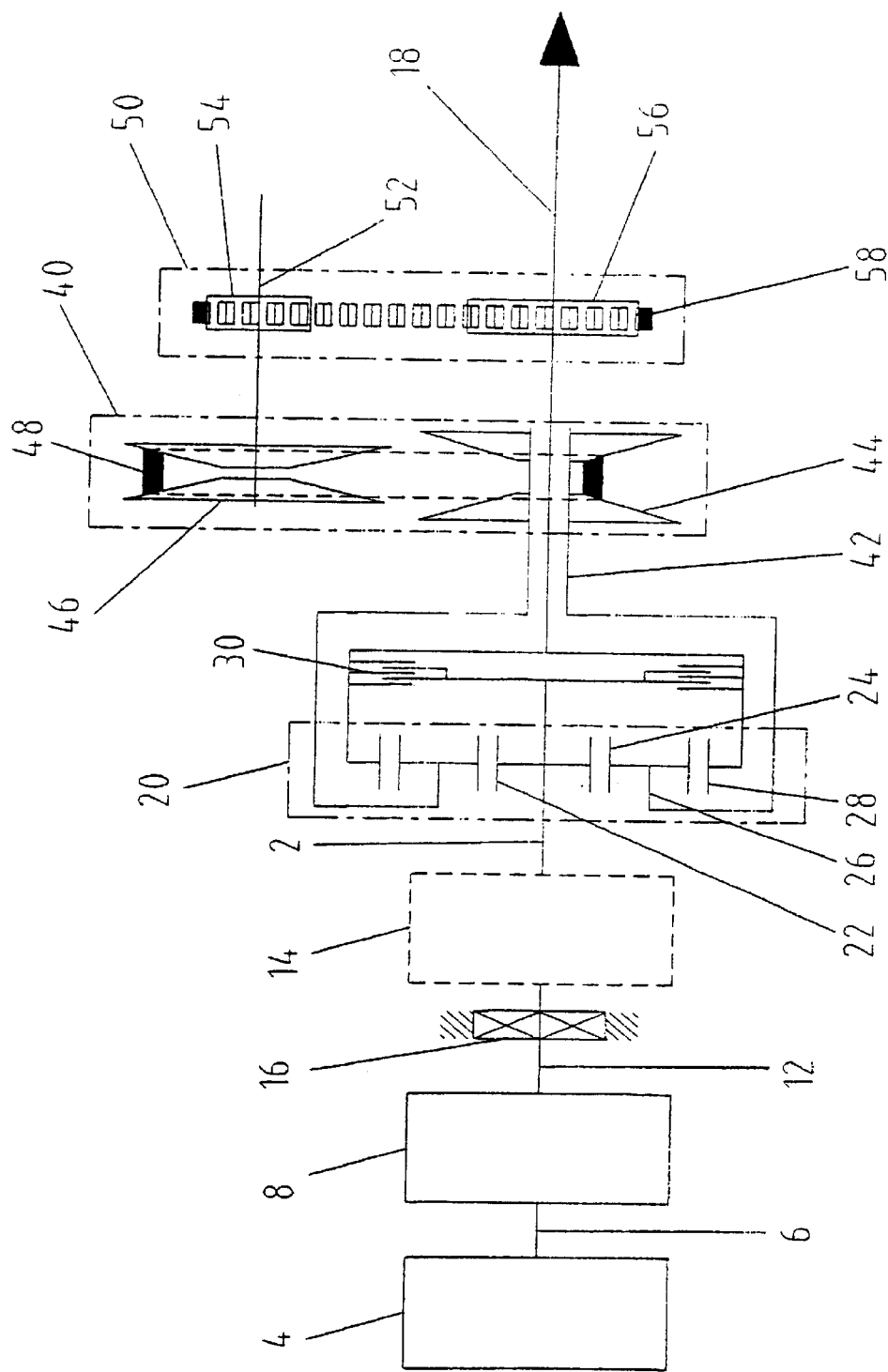
FIG. 2 is a schematic elevation illustrating a second preferred embodiment of the CVT of the present invention.
Figure 3:
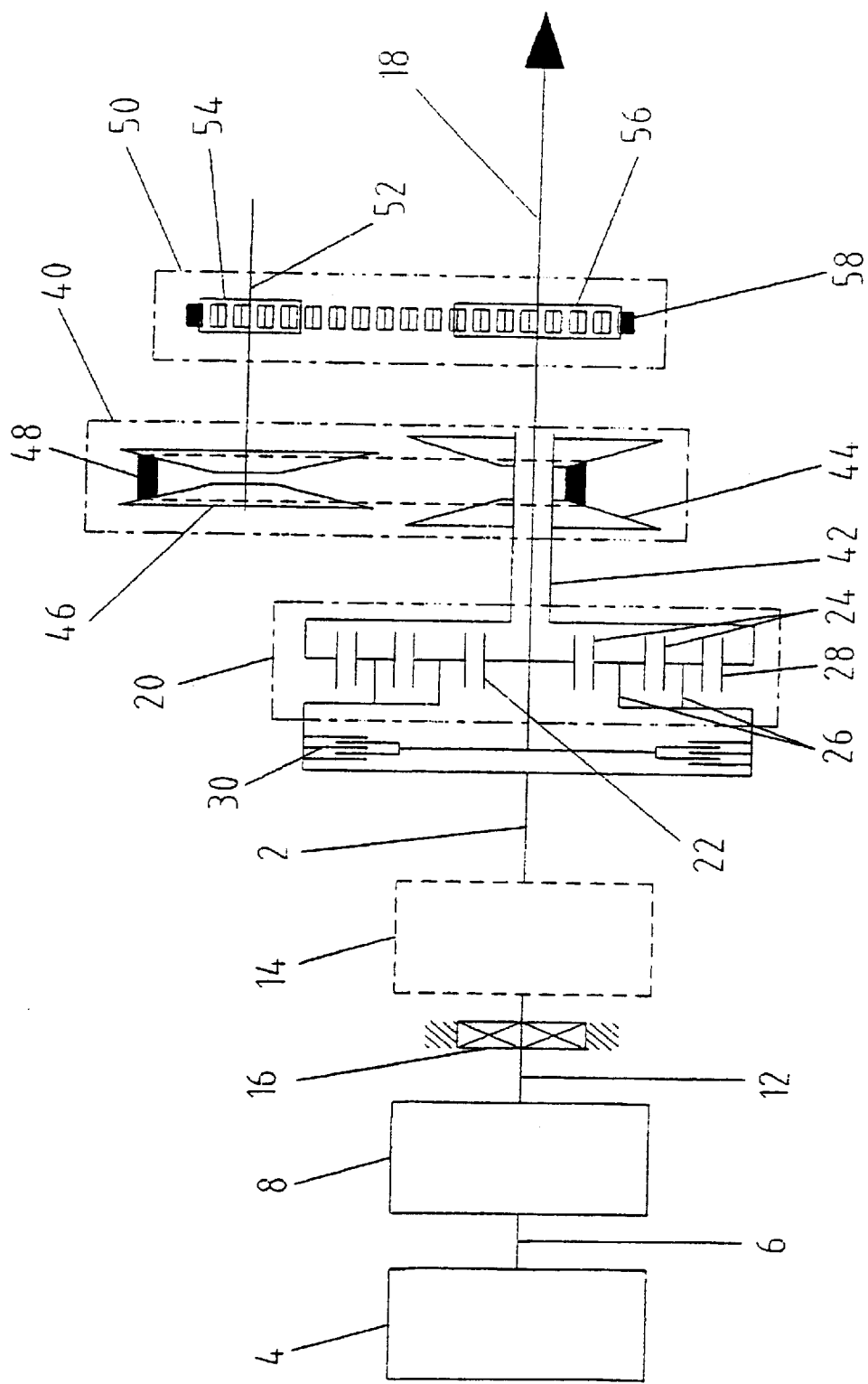
FIG. 3 is a schematic elevation illustrating a third preferred embodiment of the CVT of the present invention.
Figure 4:
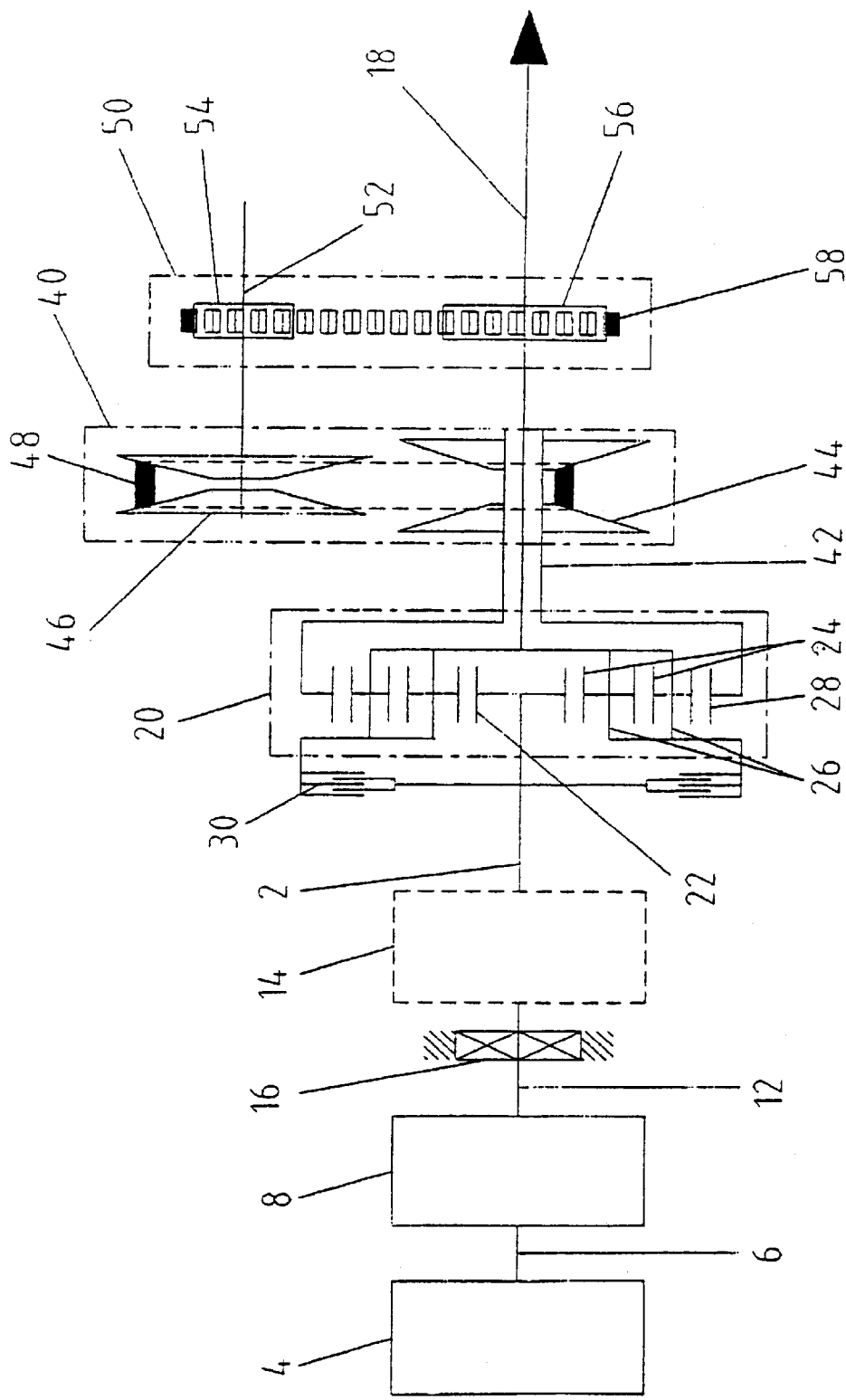
FIG. 4 is a schematic elevation illustrating a fourth preferred embodiment of the CVT of the present invention.

| Embodiment | Drawing | Gear Type | Coupling to Input Axis 2 | Coupling to Output Axis 18 | Coupling to First Continuously Variable Axis 42 |
|---|---|---|---|---|---|
| 1 | FIG. 1 | Planet gear | Ring Gear 28 | Sun Gear 22 | Carrier 26 |
| 2 | FIG. 2 | Planet gear | Sun Gear 22 | Ring Gear 28 | Carrier 26 |
| 3 | FIG. 3 | Planet gear | Carrier 26 | Sun Gear 22 | Ring Gear 28 |
| 4 | FIG. 4 | Planet gear | Sun Gear 22 | Carrier 26 | Ring Gear 28 |
| 5 | FIG. 5 | Differential gear | First Gear 21 | Second Gear 29 | Housing 27 |

The present invention is not limited to the exemplary embodiments herein and may be applicable to all devices using a driving force based on the gist of the present invention.

Such as in the present invention described above, using the continuously variable unit section having the ratio of the rotational speed of the continuously variable driving part to that of the continuously variable driven part, for example 2:1 to 0.5:1 (that is, a ratio coverage of 4.0) enables a change to the CVT having a 5.0 to 7.0 ratio coverage according to the required performance.

In addition, the present invention can dramatically prevent deterioration of transmission efficiency at high and low speeds and also can enhance the efficiency by minimizing the sliding area of the clutch at the starting stage due to a wide ratio coverage.

The present invention can realize a fuel efficiency mode for providing an optimized fuel ratio, a power mode for dynamic driving, and a low speed mode for attaining an engine break effect. Furthermore, the present invention has a wide ratio coverage and high efficiency at high and low speeds to prevent transmission efficiency from being deteriorating at high torque, thereby being applicable to a large-sized automobile and a driver apparatus using a high torque, and can be readily installed in front wheel, rear wheel or multi-wheel drive cars since it has input and output axes which are coaxially located.

What is claimed is:

1. A wide ratio coverage CVT having a driving power source, a first coupling axis, a clutch section, a second coupling axis, and a forward and rearward driving section, the CVT comprising:
    an input axis;
    an output axis located on the same axis with said input axis;
    a continuously variable unit section having a first continuously variable axis rotatably mounted on said output axis, a continuously variable driving part mounted on said first continuously variable axis, a continuously variable driven part mounted on a second continuously variable axis parallel to said input and said output axis, and a continuously variable coupler for transmitting rotational power from said continuously variable driving part to said driven part;
    a coupling section having a first coupler integrally formed with said second continuously variable axis, a second coupler integrally formed with said output axis, and a third coupler for transmitting rotational power from said first coupler to said second coupler; and
    a gear section provided in the form of a gear set located between said input axis and said continuously variable unit section,
        the respective components of said gear section being operatively coupled to said input axis, said output axis, and said first continuously variable axis.

2. The wide ratio coverage CVT as defined in claim 1, wherein said gear section is an planet gear set having a sun gear, a planet gear, a ring gear, and a carrier;
    said ring gear being operatively coupled to said input axis,
    said sun gear being operatively coupled to said output axis,
    said carrier being operatively coupled to said first continuously variable axis.

3. The wide ratio coverage CVT as defined in claim 1, wherein said gear section is an planet gear set having a sun gear, an planet gear, a ring gear, and a carrier;
    said sun gear being operatively coupled to said input axis,
    said ring gear being operatively coupled to said output axis,
    said carrier being operatively coupled to said first continuously variable axis.

4. The wide ratio coverage CVT as defined in claim 1, wherein said gear section is an planet gear set having a sun gear, an planet gear, a ring gear, and a carrier;
    said carrier being operatively coupled to said input axis,
    said sun gear being operatively coupled to said output axis,
    said ring gear being operatively coupled to said first continuously variable axis.

5. The wide ratio coverage CVT as defined in claim 1, wherein said gear section is an planet gear set having a sun gear, an planet gear, a ring gear, and a carrier;
    said sun gear being operatively coupled to said input axis,
    said carrier being operatively coupled to said output axis,
    said ring gear being operatively coupled to said first continuously variable axis.

6. The wide ratio coverage CVT as defined in claim 1, wherein said gear section is a differential gear set having a first gear, an idle gear, a second gear, and a housing;
    said first gear being operatively coupled to said input axis,
    said second gear being operatively coupled to said output axis,
    said housing being operatively coupled to said first continuously variable axis.

7. The wide ratio coverage CVT as defined in any one of claims 1 to 6, further comprising a clutch in order to make the input and output axes rotate at the same rotational speed.

8. The wide ratio coverage CVT as defined in any one of claims 1 to 6, further comprising a one-way clutch next to the clutch section in order to prevent a rotation in the reverse rotational direction of the driving power source.

9. The wide ratio coverage CVT as defined in claim 7, further comprising a one-way clutch next to the clutch section in order to prevent a rotation in the reverse rotational direction of the driving power source.

\* \* \* \* \*